United States Patent [19]

Borgstrom

[11] 3,940,017

[45] Feb. 24, 1976

[54] METHOD AND APPARATUS FOR DISPENSING BOWL-SHAPED OBJECTS OF A THIN MATERIAL ONE AT A TIME

[75] Inventor: Klas Ingvar Helmer Borgstrom, Malmo, Sweden

[73] Assignee: Aktiebolaget Platmanufaktur, Malmo, Sweden

[22] Filed: Mar. 31, 1975

[21] Appl. No.: 563,884

[30] Foreign Application Priority Data

Apr. 11, 1974 Sweden ..........................7404984

[52] U.S. Cl. ............................................... 221/211
[51] Int. Cl.² ......................................... B65H 3/08
[58] Field of Search ................ 221/211, 254, 36, 39

[56] References Cited
UNITED STATES PATENTS

| | | | |
|---|---|---|---|
| 2,668,000 | 2/1954 | Rodman............................ | 221/36 X |
| 3,401,831 | 9/1968 | Saurenmann.................... | 221/211 X |

*Primary Examiner*—Stanley H. Tollberg
*Attorney, Agent, or Firm*—Ladas, Parry, Von Gehr, Goldsmith & Deschamps

[57] ABSTRACT

The invention discloses an improved method and apparatus for separating the lowermost object from a firmly packed pile of bowl-shaped objects consisting of plastic film and having a bottom and a conical side wall and a brim projecting from the free edge of the side wall. Said pile is being supported at the brim of the lowermost object, the bottoms of the bowl-shaped objects facing downwardly. A suction means arranged for reciprocal movement is applied against the bottom of the lowermost object of the pile for pulling it off in a downward direction from the pile. Due to the suction effect of the suction means and the presence of an annular groove in the contact surface of the suction means, an annular downwardly directed bead is formed on the underside of the bottom of the lowermost bowl-shaped object in the area of the side wall at the same time as the brim of the lowermost object is being eased by the lifting up of said pile. The lowermost object of the pile is released from the pile and support means in a dispenser when the pile is lifted by means of the suction means. During the downward stroke of the suction means the lowermost object is pulled off from the pile.

5 Claims, 5 Drawing Figures

METHOD AND APPARATUS FOR DISPENSING BOWL-SHAPED OBJECTS OF A THIN MATERIAL ONE AT A TIME

BACKGROUND AND SUMMARY OF THE INVENTION

The present invention relates to a method of separating the lowermost object from a firmly packed pile of bowl-shaped objects consisting of a plastic film and having a bottom and a conical side wall and a brim projecting from the free edge of the side wall, when said pile is being supported at the brim of the lowermost objects, the bottoms of the bowl-shaped objects facing downwardly, by applying suction means against the bottom of the lowermost object of the pile for pulling it off in a downward direction from the pile.

When such bowl-shaped objects are of a very thin material, for instance plastic film having a thickness of 100 or 200 $\mu$ or even less, they are very difficult to separate one at a time from the pile, if they are so firmly packed that there is a minimum air gap or merely locally limited air bubbles between objects located adjacent each other in the pile. The problem exists for instance in connection with caps of thermoplastic film having a thickness less than 150 $\mu$, which are used for the sealing of cups for portion packing of milk, juice, etc., the caps being placed over the vessel and being thereafter caused to surround closely the orifice portion thereof by shrinking the side wall during heating thereof by means of hot air or in another way.

The invention provides an improved method of separating the lowermost object from a firmly packed pile of bowl-shaped objects; the objects consisting of plastic film and having a bottom and a conical sidewall and a brim projecting from the free edge of the side wall, said pile being supported at the brim of the lowermost object, the bottoms of the bowl-shaped objects facing downwardly; the objects being separated by applying a suction means against the bottom of the lowermost object of the pile for pulling it off in a downward direction from the pile; the improvement comprising the steps of forming an annular downwardly directed bead on the underside of the bottom of the lowermost bowl-shaped object in the area of the side wall by applying the suction means against the bottom of the lowermost object of the pile; simultaneously herewith lifting the pile at the bottom thereof so that the brim of the lowermost object is being eased; and pulling off the lowermost object from said pile by means of said suction means.

BRIEF DESCRIPTION OF THE DRAWINGS

In order to elucidate it, the invention will be described in greater detail in the following with reference to the accompanying drawings, wherein.

DETAILED DESCTIPTION OF THE PREFERRED EMBODIMENT

Figure 1:
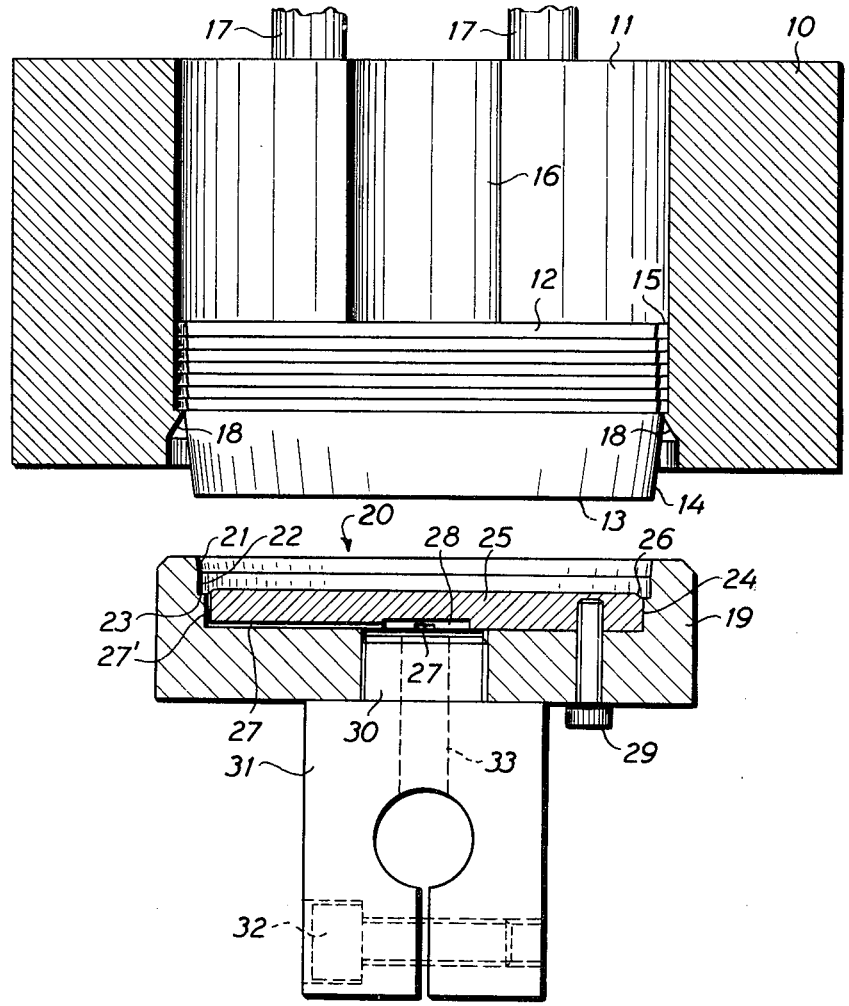
FIG. 1 is a vertical sectional view of the lower part of an apparatus for dispensing caps of plastic film one at a time by putting the method according to the invention into effect prior to the application of the suction means against the pile.
Figure 2:
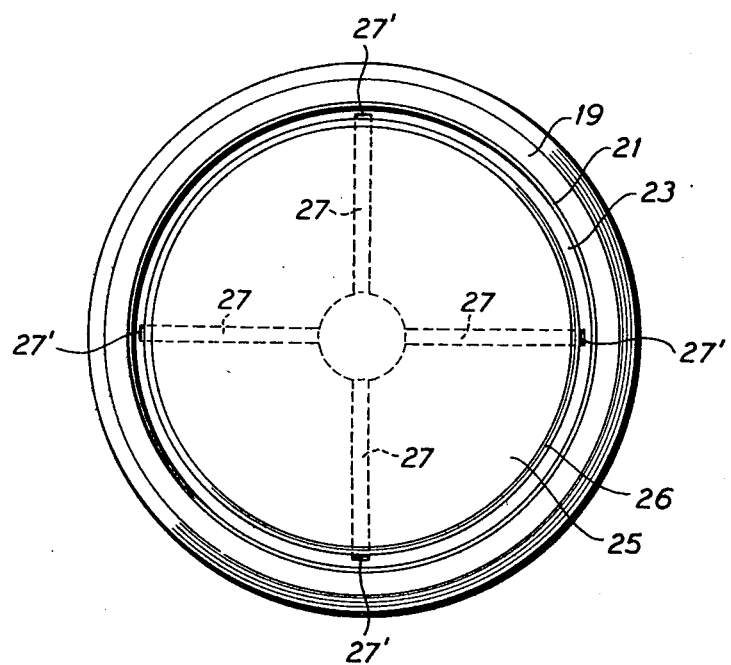
FIG. 2 is a plan view of the suction means in the apparatus.
Figure 3:
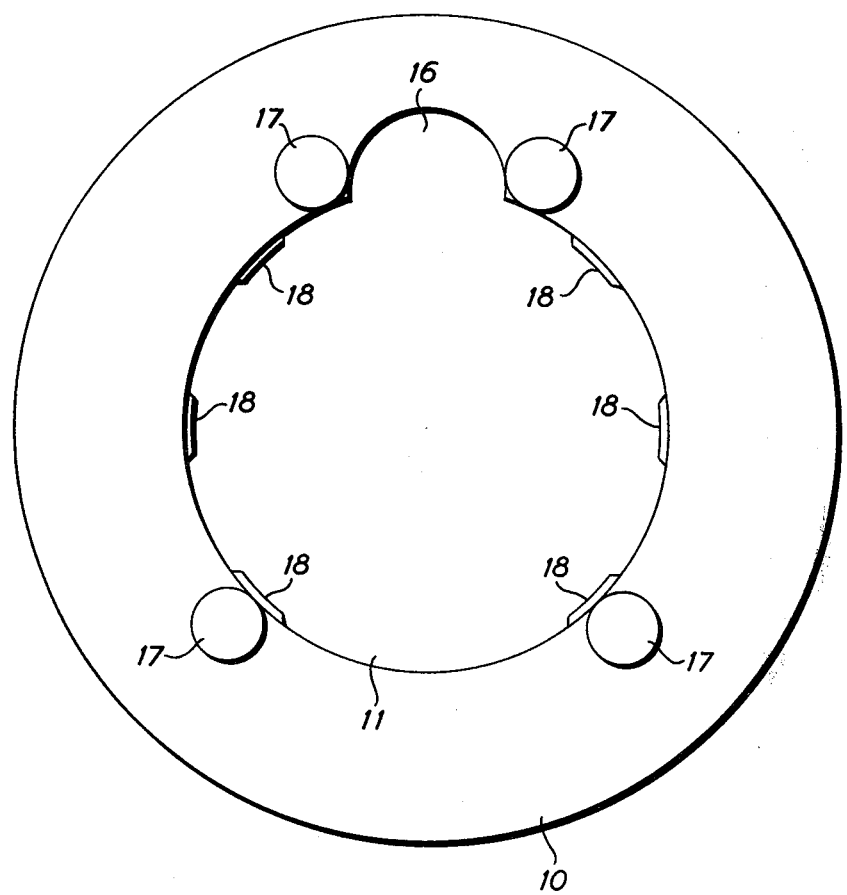
FIG. 3 is a plan view of a magazine forming part of the apparatus.

The apparatus according to the invention consists of two main parts: a magazine and a suction means. The magazine comprises a ring 10 having a central cylindrical opening 11 permitting a pile of a number of firmly packed bowl-shaped caps 12 to pass through the ring and being controlled by the side walls of the opening. The said caps are made from a thin material, for instance thermoplastic film having a thickness of less than 150 $\mu$ and comprising a normally plane bottom 13, a slightly conical side wall 14 and a brim 15 along the free edge of the side wall. The brim may also have a flap intended to serve as an opening tab and, if so, the cylindrical opening has a groove 16 fitting the flap to receive the cap flaps, therein, which should have the same direction in the pile. The pile may be higher than the ring, and vertical bars 17 extending upwardly from the ring are provided for controlling said pile above the ring.

Inside the ring six shoulders 18 are provided extending radially in the opening 11 to form abutments for the pile by supporting said pile at the brim of the lowermost cap of the pile. The said brim is not in itself sufficiently rigid to support the pile thereon, but, as will be easily realized, the rigidity required is obtained in that it rests in turn against the brims of the caps lying above in the pile.

The second principal part of the apparatus, the suction means, comprises a cylindrical suction plate 19 having a bowl-shaped cavity 20 on the top side, which has an outer slightly conical wall portion 21 of substantially the same conicity as the side wall of the caps, and an intermediate cylindrical wall portion 22 merging at a collar 23 into a cylindrical bottom portion 24 receiving a circular plate 25 having a chamfered edge 26 on the top side projecting upwards over the collar 23. For the rest, the plate has a plane top side forming together with the suction plate 19 an annular groove at the bottom of the cavity 20, said groove being delimited by the cylindrical wall portion 22, the collar 23 (the bottom in the groove) and the chamfered edge 26. On its underside the plate 25 has four (or more) grooves 27, extending radially from a central cylindrical cavity 28 on the underside of the plate 25, and the said grooves then continue with an axial portion 27' upwardly along the marginal surface of the plate and open into the chamfered edge 26. The plate is kept in place in the cavity of the suction plate by means of a screw 29 so that when necessary the plate can be removed for cleaning of the grooves 27, 27'. The suction plate is screwed onto a threaded pin 30 on a holding member 31 having a clamping screw 32, the suction plate being easily exchangeable for instance against a suction plate fitting caps of different diameters. In the holding member 31 and the pin 30 a duct 33 is provided for connecting the cavity 28 with a vacuum pump via a suitable valve, so that a suction effect can be established in the annular groove along the periphery of the plate 25 via the duct 33, the cavity 28, and the grooves 27, 27'. This connection may be provided by the means supporting the member 31 or by means of a separate hose connected to the duct 33. The suction means is controlled partly for movement up and down, towards and away from the lower end of the pile and partly for turning through 180° during this movement. The control means, however, are not shown in greater detail in the drawings, since such means may be easily suggested by the person skilled in the art.

DETAILED DESCRIPTION OF THE PERFORMANCE OF THE METHOD

The method according to the invention is put into effect in the following way, using the apparatus shown and described, special reference being made to FIGS. 4 and 5.

Figure 4:
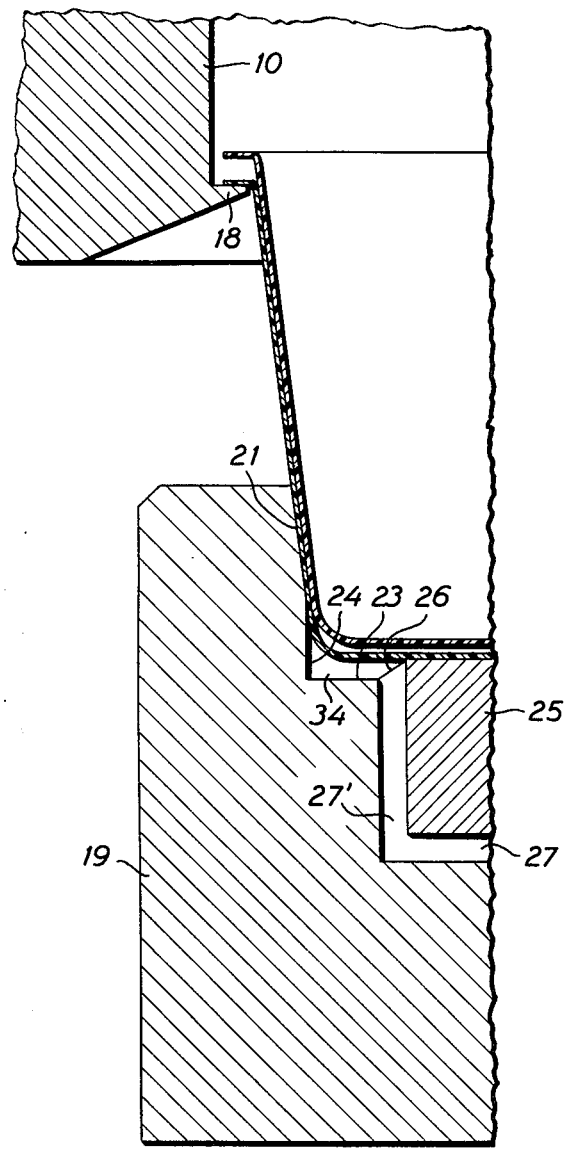
FIG. 4 is a fragmentary detail view on a larger scale of the apparatus in FIG. 1 at the very application of the suction means against the lowermost cap in the pile, prior to the suction force being exerted
Figure 5:
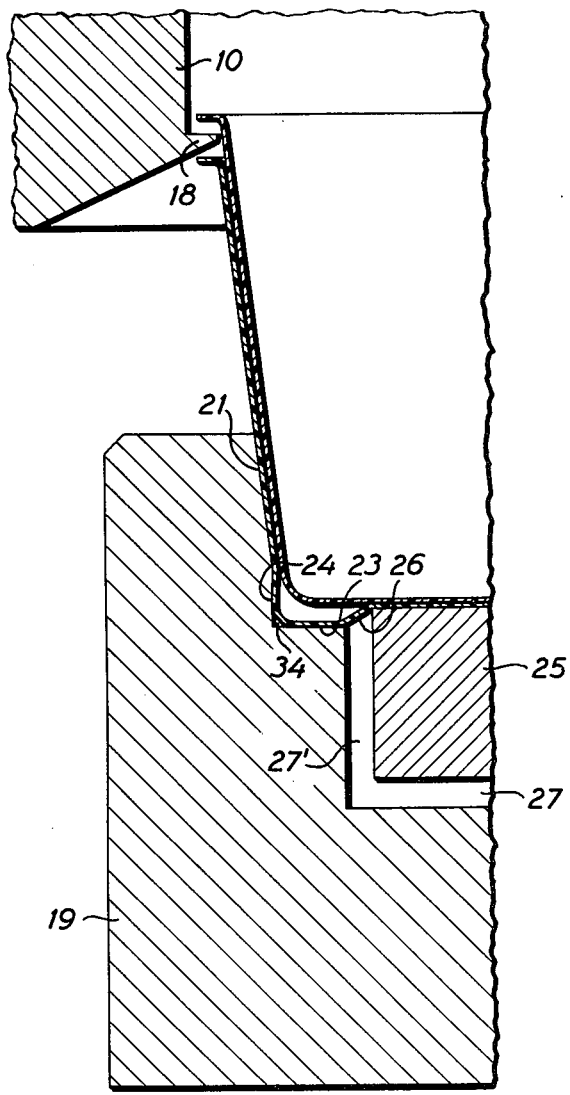
FIG. 5 is a detail view similar to FIG. 1, but during the exertion of the suction effect and a simultaneous lifting of the pile.

It is presumed that the suction means has just been applied against the lowermost cap of the pile, as shown in FIG. 4. In this Figure an air gap between the bottom of the lowermost cap and the bottom of the lowermost cap but one is shown, but in reality this air gap is not so big as shown in the Figure, since we are dealing with a firmly packed pile of caps made of a thin plastic film and thus, it will probably not extend over the entire surface of the bottom either; instead, locally delimited air bubbles may occur between the bottoms located adjacent each other. The lowermost cap rests with its brim on the shoulders 18, and in FIG. 4 it has been shown with an interspace to the brim lying above but, in fact, the brims rest against each other, as previously mentioned, since the material of the caps is extremely thin. Immediately prior to or at the application of the suction means against the pile a pressure below atmospheric is applied in the annular groove provided along the periphery of the plate 25, said groove being generally designated 34 in FIGS. 4 and 5, and while the suction means moves upwards an additional distance after the application against the lowermost cap of the pile, the pile will be lifted from the shoulders 18 and, consequently, the brim of the lowermost cap will be eased from the weight of the pile. Thus, under the influence of the pressure below atmospheric in the annular groove 34 the bottom of the lowermost cap can be sucked down into said ring groove and be caused by vacuum forming to adapt itself substantially to the shape thereof, as shown in FIG. 5, the side wall of said cap being put into sealing contact against the conical portion 21 of the sidewall of the cavity 20. While the circumferential bead is formed in response to the ring groove 34 on the underside of the bottom of the lowermost cap, said bead is filled with air flowing from the air gap or the air bubbles between the bottom of the lowermost cap and the bottom of the lowermost cap but one, which is a condition for the bead being formed at all. Part of the air between the bottoms may possibly be pressed out simultaneously between the side walls of the caps when the suction means is being urged against the pile with the plane top side of the plate 25 thereof during the lifting of said pile. Furthermore, during the forming of the bead on the underside of the bottom of the lowermost cap the brim of this cap, which, as mentioned, has been eased from the weight of the pile due to the lifting of the pile, will be easily drawn past the shoulders 18, the side wall of the lowermost cap being somewhat removed from the side wall of the lowermost cap but one due to the conicity, as shown in FIG. 5, an air gap forming simultaneously between the side walls.

In a top dead centre of its movement the suction means turns and starts moving downwards, the lowermost cap of the pile being held in a steady grip by the suction means due to the pressure below atmospheric exerted in the groove 34, so that said cap when the pile again rests on the shoulders although this time at the brim of the next cap, will be pulled off the pile, which takes place without any suction whatever between the lowermost cap and the rest of the pile, since air may flow in between the bottom of the lowermost cap and the bottom of the lowermost cap but one via the air gap formed between the side walls of these caps. The annular bead provided on the cap will be levelled out again when the suction effect of the suction means is caused to cease at the application of the cap on a cup or the like.

Through the method defined put into effect by means of the apparatus described it has proved possible to take the caps one by one from the lower end of the pile without any risk of failure in that no cap at all will be taken from the pile or in that two or more caps will be taken simultaneously. The removal of the caps one by one from the lower end of the pile takes place without any disturbing noise. Therefore, the invention is highly suitable for use at automatically operating packaging tracks.

The apparatus described is only one example of a suitable apparatus for putting the method according to the invention into effect and it should be noted that it can be worked by means of devices of other kinds within the scope of the general inventive idea defined in the claims.

What is claimed is:

1. In a method of separating the lowermost object from a firmly packed pile of bowl-shaped objects; the objects consisting of plastic film and having a bottom and a conical sidewall and a brim projecting from the free edge of the side wall, said pile being supported at the brim of the lowermost object, the bottoms of the bowl-shaped objects facing downwardly; the objects being separated by applying a suction means against the bottom of the lowermost object of the pile for pulling it off in a downward direction from the pile; the improvement comprising the steps of forming an annular downwardly directed bead on the underside of the bottom of the lowermost bowl-shaped object in the area of the side wall by applying the suction means against the bottom of the lowermost object of the pile; simultaneously herewith lifting the pile at the bottom thereof so that the brim of the lowermost object is being eased; and pulling off the lowermost object from said pile by means of said suction means.

2. In a method as claimed in claim 1, wherein the side wall of the lowermost bowl-shaped object is brought into sealing contact against an annular support surface on the suction means simultaneously as said suction means provides the annular bead.

3. In an apparatus for dispensing bowl-shaped objects consisting of a plastic film and having a bottom and a conical side wall and a brim projecting from the free edge of the side wall, the objects being dispensed one by one from a firmly packed pile of such objects, the improvement comprising a support means for supporting the pile at the brim of the lowermost bowl-shaped object of the pile of reciprocable suction means which is applicable with a substantially plane support surface against the bottom of the lowermost object of the pile for lifting the pile from the support means and having an annular cavity provided around the support surface for vacuum forming of an annular downwardly-directed bead on the underside of the bottom of the lowermost object in the area of the side wall of said object.

4. In an apparatus as claimed in claim 3, wherein the suction means comprises a support surface for the side wall of the lowermost bowl-shaped object having substantially the same conicity as the side wall.

5. In an apparatus as claimed in claim 3, wherein the suction means is bowl-shaped having a cavity for receiving the bottom portion of the lowermost bowl-shaped object of the pile.

* * * * *